United States Patent [19]

Streed

[11] 4,320,720

[45] Mar. 23, 1982

[54] GEOTHERMAL LIVESTOCK WATERER

[76] Inventor: Clifford P. Streed, R.R. 2, Mt. Vernon, Iowa 52314

[21] Appl. No.: 119,258

[22] Filed: Feb. 7, 1980

[51] Int. Cl.³ .............................................. A01K 7/00
[52] U.S. Cl. ...................................... 119/73; 165/45; 165/104.21
[58] Field of Search ...................... 165/45, 105, 104.21; 119/73

[56] References Cited

U.S. PATENT DOCUMENTS

| | | | |
|---|---|---|---|
| 2,548,325 | 4/1951 | Smith | 165/105 X |
| 2,612,138 | 9/1952 | Lindemann | 119/73 X |
| 2,937,009 | 5/1960 | Anderson | 165/45 X |
| 3,382,313 | 5/1968 | Angello | 165/105 X |
| 3,745,977 | 7/1973 | Martin | 119/73 |
| 3,859,800 | 1/1975 | Wuelpern | 165/45 X |
| 4,162,684 | 7/1979 | Loveless, Jr. | 165/106 X |

FOREIGN PATENT DOCUMENTS 575072  10/1977  U.S.S.R. .................. 119/73

*Primary Examiner*—Albert W. Davis
*Attorney, Agent, or Firm*—Allan L. Harms

[57]  ABSTRACT

A livestock waterer is described which is automatically heated through use of geothermal energy within the earth. Working fluid is housed within a reservoir below the surface of the earth, is heated to evaporation by geothermal heat, is transferred to a condensation chamber adjacent a water container, whereupon condensation of said working fluid occurs transferring heat to the water within the water container. Condensed working fluid is returned to the reservoir. An insulating lid is shown which allows demand use of the waterer by livestock and aids in the retention of heat within the water supply.

4 Claims, 2 Drawing Figures

GEOTHERMAL LIVESTOCK WATERER

SUMMARY OF THE INVENTION

The instant invention relates to livestock watering devices, and in particular to heaters for said watering devices.

It is common practice to provide water to livestock, pets, zoo animals and other animals in pens or enclosures, as well as in pastures or on feeding ranges. The method employed for this is generally by providing an open container or tank supplied by a water supply for access by the animals upon demand. This provides a satisfactory water supply to the animals when the ambient atmospheric temperature is above the freezing point of water. However, at other times, without a heating source provided to the water container or tank, the water therein freezes and deprives the animals of their water supply. To solve this problem, it has been common practice to provide a heat source to the container to prevent freezing of the water therein. This has been done through use of resistive electrical current heating and by use of fossil fuel-burning heaters which may be immersed in the container. One other freeze prevention method is through use of water turbulence which is provided through pump means, powered, of course, by fossil fuel or electrical energy. In addition, efforts must be expended to insure continued supply of fossil fuel or electricity to the water heating devices, and unavoidable interruption of the energy supply may occur.

The instant invention solves the above described problems. The novel livestock waterer herein presented consists of a water container, a chamber adjacent said water container, a reservoir containing a working fluid, duct means connecting said reservoir with said chamber for conveyance of working fluid vapor therebetween, duct means connecting said chamber with said reservoir for conducting liquid working fluid therebetween, means for addition of working fluid, a water supply duct, an automatic water supply valve, insulation surrounding the device, and an optional insulating cover for said water container.

This invention allows use of specific heat contained within the earth below its surface to warm water available to such animals as livestock, pets, zoo animals and the like.

One object of the invention is to provide a liquid water supply to animals regardless of the ambient atmospheric temperature surrounding the supply of water.

Another object is to provide heat to a water supply for animals without the exhaustion of fossil fuels, either directly or through conversion to electrical energy.

Another object is to provide a water supply for animals which needs no attention from the operator thereof to assure a continued heat supply to the water provided.

Another object is to provide an insulated water supply to which animals may gain access without intervention by human effort.

Another object is to provide a method of heating unattended livestock water supplies.

These objects and advantages will be apparent from the ensuing description.

DETAILED DESCRIPTION

Figure 1:
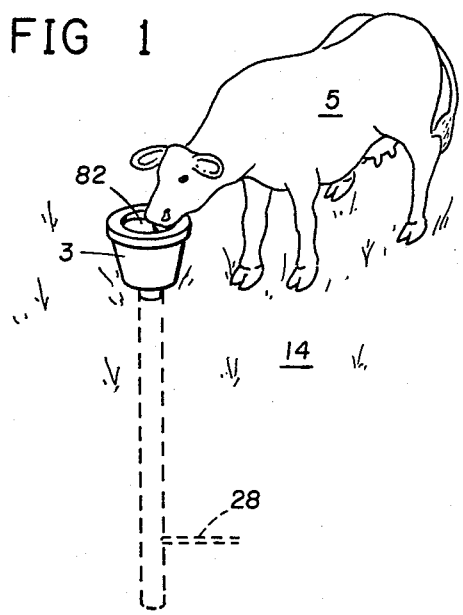
FIG. 1 is a perspective view of the invention installed in the earth and in use by an animal.
Figure 1:
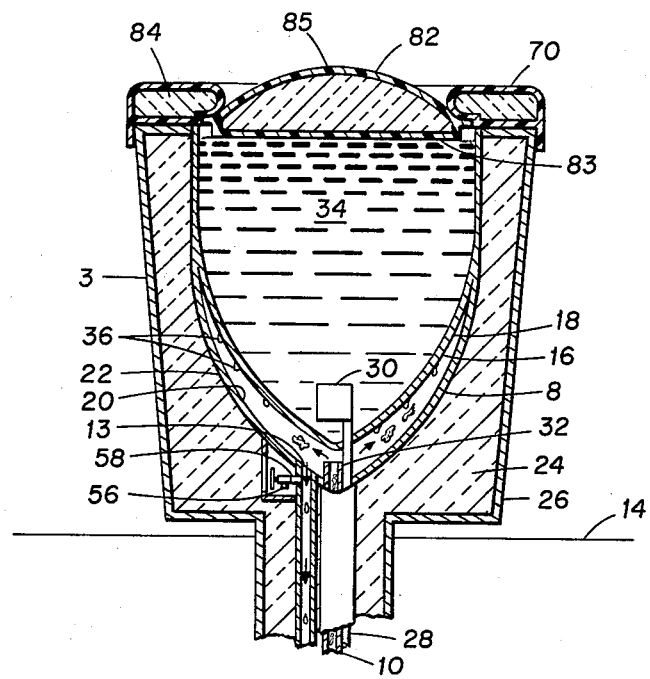

In FIG. 1, invention 3 is shown installed in the earth 14 and is being utilized by cow 5. Depending from invention 3 at a suitable, frost-free depth within earth 14 is water supply duct 28. Float element 82 is being depressed by cow 5 to allow access to water within invention 3.

Figure 2:
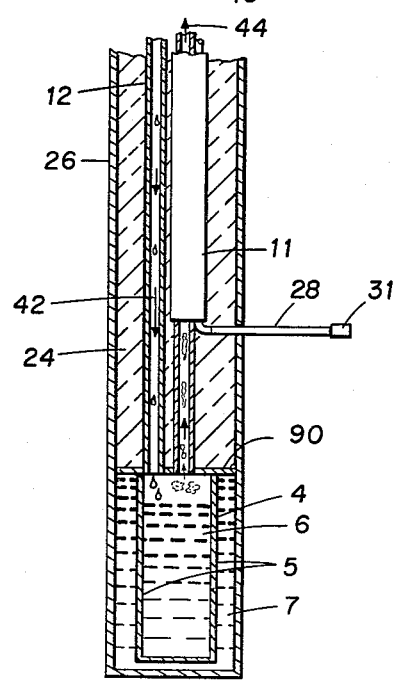
FIG. 2 is a cross section of the invention along a central vertical plane.

Further referring to the drawings and particularly to FIG. 2, invention 3 is shown imbedded in the earth such that reservoir 4 is at a depth below the local frost depth. Invention 3 comprises said reservoir 4 connected to a chamber 8 by ducts 10 and 12. In this preferred embodiment, chamber 8 is formed by the intersection of curved wall 16 of container 18 and curved surface 20 of inner shell 22. Surrounding inner shell 22 is insulating material 24 and outer shell 26. Insulating material 24 also surrounds ducts 10 and 12 and water supply duct 28 along their lengths. Water supply duct 28 is positioned alongside and in touching relationship to duct 10. Sleeve 11 encapsulates water supply duct 28 and duct 10 to insure thermal conduction between duct 10 and water supply duct 28, as well as to aid in insulation of said ducts from duct 12 and the external environment of invention 3. Divider 90 terminates the insulation 24 surrounding ducts 10 and 12 and water supply duct 28 at the top of reservoir 4. Water supply duct 28 extends from control valve 30 to below grade and connects by coupling 31 to an appropriate water supply below frost level. The upper end 32 of duct 10 protrudes into chamber 8. Contained in reservoir 4 is a working fluid 6 having a boiling point below the freezing point of water. Specific heat from the earth is transferred to working fluid 6 through walls 5 of reservoir 4 and through water 7 surrounding reservoir 4 and within outer shell 26. Said specific heat causes some of the working fluid to vaporize and to travel by convection from reservoir 4 upwards within duct 10 in the direction of arrow 44 and into chamber 8. Heat energy from the working fluid vapor is transferred to surface 16 of container 18 and then is conducted through container 18 to water 34. Heat exhausts from the vapor to the water and this exhaustion of heat from the working fluid vapor causes condensation of said vapor into droplets 36. Droplets 36 then exit chamber 8 through duct 12, the upper end 13 of which opens into said chamber 8. Droplets 36 then pass down duct 12 in the direction of arrow 42. The upper end 13 of duct 12 is flush with inner surface 20 of chamber 8. Stem 58 is penetratingly attached at one end thereof to duct 12 and terminates in inlet valve 56 at the other end. Stem 58 with inlet valve 56 is available to allow introduction of working fluid into duct 12 and thence into reservoir 4. Also, as shown in FIG. 2, invention 3 contains cover 70 consisting of insulating material. Cover 70 comprises float element 82 and stationary element 84. Stationary element 84 surrounds an opening which is shaped substantially identically to the shape of float element 82 but is of cross sectional area less than that of the base 83 of float element 82. Float element 82 has curved upper surface 85 and rests atop water 34 within the opening of stationary element 84 and touchingly adjacent stationary element 84 such that when downward pressure is exerted against float element 82, water 34 is made available atop float element 82. When downward force is removed from said float element 82, it returns to its quiescent position, touchingly adjacent stationary element 84 and atop water 34.

Having thus described the invention, I claim:

1. The method of delivering heat to an open animal watering device, including the steps of
    the transfer of heat from below the surface of the earth by the geothermally induced evaporation of a working fluid in a reservoir within the earth,
    the transfer of vaporized working fluid to a chamber adjacent a container for water above the surface of the earth,
    the condensation into liquid form of the working fluid in said chamber,
    the transfer of heat released in said condensation process to the water in the above ground container by conduction through a common wall between said chamber and said water container,
    the transfer of condensed working fluid from the chamber to the reservoir.

2. Apparatus for utilization of geothermal energy to heat an animal water supply comprising
    a reservoir located below the surface of the earth,
    a working fluid contained within said reservoir,
    an open, curved-bottom container for water located above the surface of the earth, said container having a shell and an inner wall,
    a chamber disposed adjacent said container,
    said chamber being enclosed between said shell and said inner wall of said container,
    first heat transfer means for conveying thermal energy from the earth to said working fluid in said reservoir,
    second heat transfer means for conveying heat energy from said chamber to said container,
    first duct means for conveying heated vapor of said working fluid from said reservoir to said chamber,
    second duct means for conveying liquid working fluid from said chamber to said reservoir,
    means for supplying water to said container,
    insulative means for thermally insulating said ducts in said chamber.

3. Apparatus for utilization of geothermal energy to heat an animal water supply comprising
    a reservoir located below the surface of the earth,
    a working fluid contained within said reservoir,
    a container for water located above the surface of the earth,
    a chamber disposed adjacent said container,
    first heat transfer means for conveying thermal energy from the earth to said working fluid in said reservoir,
    second heat transfer means for conveying heat energy from said chamber to said container, wherein said second heat transfer means is the thermally-conductive wall of said container,
    first duct means for conveying heated vapor of said working fluid from said reservoir to said chamber,
    second duct means for conveying liquid working fluid from said chamber to said reservoir,
    means for supplying water to said container,
    insulative means for thermally insulating said ducts and said chamber.

4. Apparatus for utilization of geothermal energy to heat an animal water supply comprising
    a reservoir located below the surface of the earth,
    a working fluid contained within said reservoir,
    a container for water located above the surface of the earth,
    a chamber disposed adjacent said container,
    first heat transfer means for conveying thermal energy from the earth to said working fluid in said reservoir,
    second heat transfer means for conveying heat energy from said chamber to said container,
    first duct means for conveying heated vapor of said working fluid from said reservoir to said chamber,
    second duct means for conveying liquid working fluid from said chamber to said reservoir,
    insulative means for thermally insulating said ducts and said chamber,
    an elongated tube for supplying water to said container,
    said elongated tube having an upper end and a lower end with said upper end terminating in a water level control valve within said water container,
    said elongated tube being positioned adjacent said first duct means and in touching relationship therewith,
    said lower end of said elongated tube extending outside said insulative means and a sleeve encapsulating said water supply duct and said first duct means.

* * * * *